United States Patent [19]

Tamba et al.

[11] Patent Number: 4,898,040
[45] Date of Patent: Feb. 6, 1990

[54] POWER TRANSMISSION APPARATUS

[75] Inventors: Shinichi Tamba, Kobe; Takeshi Miyazaki, Miki; Akio Miguchi, Kobe, all of Japan

[73] Assignee: Kawasaki Jukogyo Kabushiki Kaisha, Japan

[21] Appl. No.: 259,778

[22] Filed: Oct. 19, 1988

[30] Foreign Application Priority Data

Oct. 23, 1987 [JP] Japan ............................ 62-162660[U]

[51] Int. Cl.$^4$ ........................ F16H 37/06; F16H 55/06
[52] U.S. Cl. ................................ 74/15.63; 74/421 A; 74/DIG. 10; 74/606 R; 123/195 R
[58] Field of Search ............. 74/15.63, 421 R, 421 A, 74/606 R, DIG. 10; 123/195 R

[56] References Cited

U.S. PATENT DOCUMENTS

| 2,839,943 | 6/1958 | Caldwell et al. | 74/DIG. 10 X |
| 3,060,902 | 10/1962 | Hoenick | 123/195 R X |
| 3,384,063 | 5/1968 | Moulton et al. | 123/195 R X |
| 3,452,610 | 7/1969 | Beasley et al. | 74/15.63 X |
| 3,502,059 | 3/1970 | Davis et al. | 123/195 R X |
| 4,339,490 | 7/1982 | Yoshioka et al. | 428/213 |
| 4,526,921 | 7/1985 | Sakurai et al. | 524/405 |
| 4,725,392 | 2/1988 | Matsui et al. | 521/185 X |

FOREIGN PATENT DOCUMENTS 60-70702 5/1985 Japan .

Primary Examiner—Allan D. Herrmann
Attorney, Agent, or Firm—Leydig, Voit & Mayer

[57] ABSTRACT

A power transmission apparatus has a first shaft and a second shaft which are supported by an aluminum housing, and an iron gear and a synthetic resin gear which are respectively mounted on the two shafts and are engaged with each other. The synthetic resin used for the synthetic resin gear contains an aromatic polyamide fiber.

6 Claims, 1 Drawing Sheet

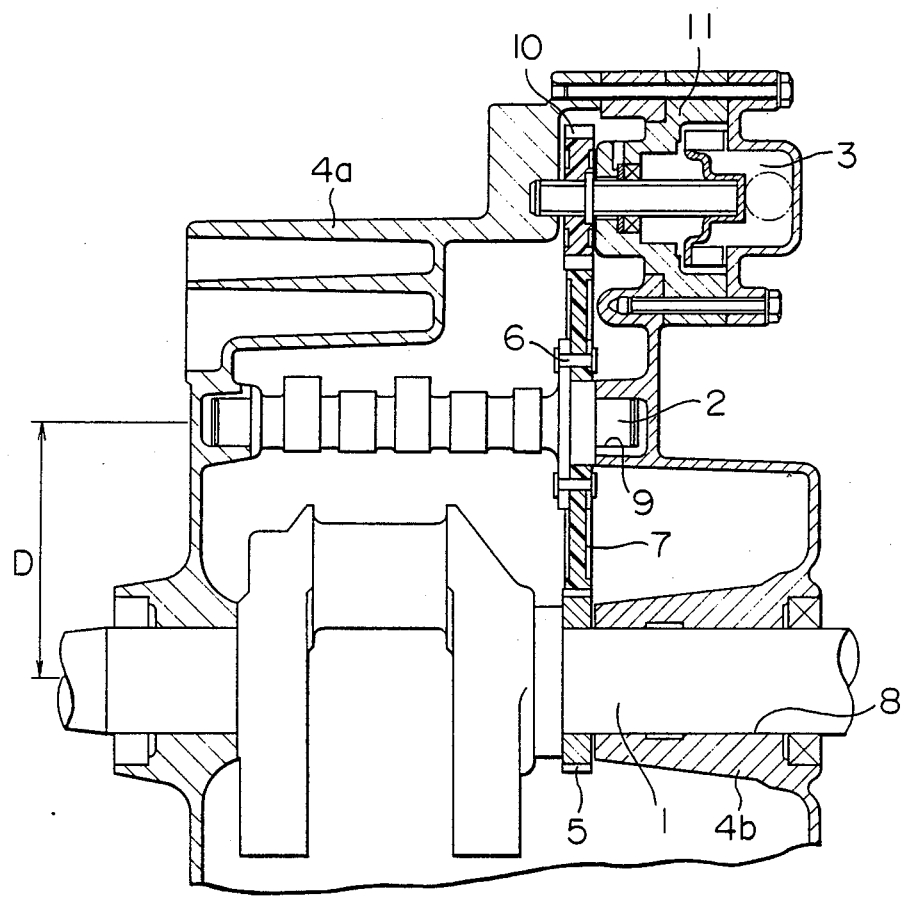

POWER TRANSMISSION APPARATUS

BACKGROUND OF THE INVENTION

1. Field of the Invention

The present invention relates to a power transmission apparatus using gears. More particularly, it relates to a power transmission apparatus having a first shaft and a second shaft each supported by an aluminum housing, and an iron gear and a synthetic resin gear which are mounted on to said two shafts respectively and are engaged with each other.

2. Description of the Prior Art

Previously known materials used for a gear, a power transmission element, include those which comprise a synthetic resin as the main component (see, for example, Japanese Utility Model Application Kokai (Laid-Open) No. 70,702/85). Synthetic resin gears of this kind are used, for example, for camshaft gears of engines. An example of such uses will be described below with reference to the accompanying figure illustrating a working example of that utility model.

In the FIGURE, 1 indicates the crankshaft of an engine (a first shaft), 2 indicates the camshaft (a second shaft), 4a indicates a crankcase (housing) and 4b indicates the crankcase cover (housing). The crankshaft 1 and the camshaft 2 are arranged in parallel with each other and are supported by the crankcase 4a and the crankcase cover 4b. The crankshaft gear 5 made of iron press-fitted to the crankshaft 1 and the camshaft gear 7 made of synthetic resin fixed to the camshaft 2 with rivets 6 engage with each other and transmit the torque of the crankshaft 1 to the camshaft 2. In the prior art, as the material for the camshaft gear 7, synthetic resins containing with glass fibers have been used to improve the mechanical properties of the camshaft gear 7.

Since the camshaft gear 7 is made of a synthetic resin, it is abraded by meshing with the crankshaft gear 5 made of iron even though the resin contains glass fibers, causing the glass fibers to fall off into lubricating oil. Since the glass fibers which fall off are minute, they get into, for example, such sliding parts as the bearing parts 8 and 9 of the crankshaft 1 and the camshaft 2. Since the glass fiber is very hard, the above-mentioned phenomenon brings about the disadvantage of abrasion of the sliding parts. Further, there is another disadvantage in that the glass fibers come up to the surface of the gear teeth on the side of the camshaft gear 7 made of resin, whereby the abrasion of the opposing crankshaft gear 5 of iron is increased.

As a means for solving such problems, it is possible to secure the necessary mechanical properties of the gear, without including glass fibers in the synthetic resin, by increasing the face width, changing to a resin with more enhanced heat resistance, or adding a substance capable of enhancing sliding such as molybdenum. However, the elimination of glass fibers increases the coefficient of linear expansion of the resulting material and markedly increases the change of backlash with temperature. Thus, the coefficient of linear expansion is $2.3 \times 10^{-5}$/deg C for aluminum, $1.2 \times 10^{-5}$/deg C for iron and $9 \times 10^{-5}$/deg C for the synthetic resin. Accordingly, with respect to the distance D between the crankshaft 1 and the crankshaft 2, the sum of the magnitude of expansion (or contraction) of the two gears 5 and 7 is larger than the magnitude of expansion (or contraction) of the crankcase 4, so that the backlash between the two gears 5 and 7 will differ greatly from the set value with changes in temperature.

If the change of backlash with temperature is large, when, for example, the backlash is so set as to be optimum at high temperatures, the backlash will become excessively large at low temperatures, causing emission of noise. On the contrary, when the backlash is so set as to be optimal at low temperatures, the backlash will become small at high temperatures, causing emission of noise and severe abrasion.

On the other hand, phenolic resins and the like containing cloth or wood chips have little of the above-described problems with respect to both contamination and backlash. However, generally they require the process of gear cutting, which markedly lowers the production efficiency.

SUMMARY OF THE INVENTION

According to the present invention, there is provided a power transmission apparatus having a first shaft and a second shaft supported by an aluminum housing, and an iron gear and a synthetic resin gear which are mounted on the two shafts respectively and are engaged with each other wherein the synthetic resin used for the synthetic resin gear is incorporated with aromatic polyamide fibers.

Thus, the present invention has been accomplished to solve the above-described problems of the prior art and has the object of providing a power transmission apparatus in which the change of backlash due to changes in temperature is small, in which the abrasion of the iron gear is slight, in which the sliding parts are free from abrasion due to fallen-off matter from the synthetic resin gear, and which can be produced with great efficiency.

To attain the above-mentioned object, according to the present invention, aromatic polyamide fibers are incorporated into the synthetic resin used for the synthetic resin gear.

Materials usable for the synthetic resin gear are polyamide resins such as nylon and the like.

The aromatic polyamide fibers to be incorporated are mixed with the resin in a proportion of 15 to 45 wt% to form a uniform mixture.

According to the present invention, since the resin gear is formed out of a synthetic resin containing aromatic polyamide fibers which decrease the coefficient of linear expansion of the gear materials, the change of backlash due to temperature increases can be decreased and also the noise and the abrasion of the gear can be decreased. Further, since an aromatic polyamide fiber has a low hardness unlike a glass fiber, there is no likelihood of causing the abrasion of the sliding parts even when it falls off from the synthetic resin. Further, the abrasion of the iron gear is also decreased.

BRIEF DESCRIPTION OF THE DRAWING

The sole FIGURE is a sectional view illustrating a part of an engine to which the present invention is applied.

DESCRIPTION OF THE PREFERRED EMBODIMENTS

Example

An example of the present invention will be described below with reference to the accompanying FIGURE.

In the FIGURE, a camshaft gear 7 is formed out of a synthetic resin containing aromatic polyamide fibers. An "aromatic polyamide fiber" means herein a fiber obtained by subjecting aromatic materials, such as an aromatic dicarboxylic acid and an aromatic diamine, to polyamidation and then forming the reaction product into fibers. Among aromatic polyamide fibers, particularly preferred are aramid fibers. On the other hand, the synthetic resin of the main component is preferably a polyamide such as nylon-6, which is a linear polyamide. To mention an example of the characteristic property of such a composite material, nylon 6 containing 15 to 20% by weight of aramid fiber having a length of 3 mm and a diameter of 12 μm has a coefficient of linear expansion of $4 \times 10^{-5}$/deg C.

Numeral 3 indicates a water pump, the details thereof being omitted from the FIGURE. The water pump 3 is driven by torque transmitted through a pump gear 10 which engages with the camshift gear 7. The pump gear 10 is, like the camshaft gear 7, formed out of the synthetic resin incorporated with aromatic polyamide fiber mentioned above. Numeral 11 indicates the water pump housing. The structure is otherwise similar to that of the prior example mentioned above, so that a detailed description is omitted here.

In the above construction, according to the present invention, aromatic polyamide fibers are incorporated into the synthetic resin, whereby the coefficient of linear expansion of the camshaft gear 7 becomes smaller than that of a gear containing no such fiber. Consequently, the sum of the expansion of the camshaft gear 7 and that of the crankshaft gear 5 made of iron approaches the expansion of the crankcase 4a and the crankcase cover 4b made of aluminum. Accordingly, the change of the backlash between the two gears 5 and 7 with increase in temperature is small, whereby the emission of noise due to an excessively large backlash and the severe abrasion of the camshaft gear 7 can be avoided. Further, the mechanical properties of the camshaft gear 7 and its dimensional accuracy in injection molding themselves are improved. Also, since no gear cutting process is required, the production efficiency is not adversely affected.

Aromatic polyamide fibers have, unlike glass fibers, a low hardness. Therefore, when the aromatic polyamide fibers fall off from the camshaft gear 7 or the pump gear 10, there is no possibility of the fallen-off fibers causing the abrasion of such sliding parts as the bearing parts 8 and 9 of the crankshaft 1 and the camshaft 2 even when the fibers get into these sliding parts. The abrasion of the directly engaging crankshaft gear 5 made of iron is also decreased.

Although this example was described above with reference to the crankshaft gear 5 and the camshaft gear 7 of an engine, the present invention may also be applied, instead of the camshaft gear 7, for example to a balance gear, oil pump gear and the like. Further, the present invention may be applied to power transmission apparatuses for other uses than engines, which are also within the scope of the present invention. When the invention is applied to an internal combustion engine which undergoes a large temperature change, such as an automobile engine, the aforesaid effect of decreasing the change of backlash is of great significance.

The words "aluminum" of "iron" used herein for the materials of housings, gears, etc. mean metals comprising aluminum or iron as the main component.

The present invention can be applied not only to those gears which are mounted on shafts that are parallel with each other, such as spur gears, helical gears and double helical gears, but also to those gears which are mounted on two shafts perpendicular to each other, such as worm gears, bevel gears and the like, to take advantage of the small thermal expansion of resin gears.

To make the aforesaid effect of decreasing the backlash more clearly understood, some examples of calculations are shown in Tables 1 and 2. In the Tables, a resin gear having a coefficient of linear expansion of $9 \times 10^{-5}$/deg C is used in Comparative Examples, whereas a resin containing an aromatic polyamide fiber is used in the Examples of the invention; the aromatic polyamide fiber used is an aramid and the amount used is 18% by weight. The iron gear and the aluminum housing have a coefficient of linear expansion of $1.2 \times 10^{-5}$/deg C and $2.3 \times 10^{-5}$/deg C, respectively.

Table 1 shows the results of calculation conducted for primary balancer gears wherein the pitch circle raddi A and B of the resin gear and the iron gear are both 100 mm and the distance D is 200 mm. Table 2 shows the results of calculations for camshaft gears wherein the pitch circle radii A and B of the resin gear and the iron gear are 100 mm and 200 mm, respectively, and the distance D is 300 mm.

TABLE 1

|  |  | Resin gear pitch circle radius (A) | Iron gear pitch circle radius (B) | Distance between shafts (D) | (Unit: mm) Change with temperature (A + B − D) |
|---|---|---|---|---|---|
| 20° C. | Standard | 100 | 100 | 200 | — |
| 100° C. | Comparative Example 1 | 100.72 | 100.096 | 200.368 | 0.448 |
|  | Example 1 | 100.32 | 100.096 | 200.368 | 0.048 |

TABLE 2

|  |  | Resin gear pitch circle radius (A) | Iron gear pitch circle radius (B) | Distance between shafts (D) | (Units: mm) Change with temperature (A + B − D) |
|---|---|---|---|---|---|
| 20° C. | Standard | 200 | 100 | 300 | — |
| 100° C. | Comparative Example 2 | 201.44 | 100.096 | 300.552 | 0.984 |
|  | Example 2 | 200.64 | 100.096 | 300.552 | 0.184 |

As described above, according to the present invention, in a power transmission apparatus in which an iron gear and a synthetic resin gear which engage with each other are mounted on two shafts supported by aluminum housings, the synthetic resin contains aromatic polyamide fibers, whereby the change of backlash due to temperature change is decreased and the noise and the abrasion of the gears can also be lowered. Further, the abrasion of sliding parts including bearings, etc. caused by fallen-off fibers and the abrasion of the directly engaging iron gear can be decreased. Moreover, the production efficiency is not adversely affected.

What is claimed is:

1. A power transmission apparatus comprising:
an aluminum housing;
a first shaft and a second shaft which are rotatably supported by said housing;
an iron gear which is mounted on said first shaft; and
a synthetic resin gear which is mounted on said second shaft and engages with said iron gear, said synthetic resin gear comprising a synthetic resin and aromatic polyamide fibers which are incorporated into the synthetic resin.

2. A power transmission apparatus as claimed in claim 1 wherein said iron gear is a crankshaft gear and said synthetic resin gear is a camshaft gear.

3. A power transmission apparatus as claimed in claim 1 wherein said synthetic resin is a linear polyamide resin.

4. A power transmission apparatus as claimed in claim 3 wherein said linear polyamide resin is nylon 6.

5. A power transmission apparatus as claimed in claim 1 wherein said synthetic resin gear comprises a linear polyamide resin and 15-45% by weight of aromatic polyamide fibers which are incorporated into said linear polyamide resin.

6. A power transmission apparatus as claimed in claim 1 wherein said synthetic resin gear has a coefficient of linear expansion of approximately $4 \times 10^{-5}$/deg C.

* * * * *